(12) United States Patent
Margolis (10) Patent No.: US 7,074,444 B2
(45) Date of Patent: *Jul. 11, 2006

(54) METHOD FOR PRODUCING A DEHYDRATED WHOLE FOOD PRODUCT

(76) Inventor: Geoffrey Margolis, 12229 Falkirk La., Los Angeles, CA (US) 90049

( * ) Notice: Subject to any disclaimer, the term of this patent is extended or adjusted under 35 U.S.C. 154(b) by 410 days.

This patent is subject to a terminal disclaimer.

(21) Appl. No.: 10/300,197

(22) Filed: Nov. 19, 2002

(65) Prior Publication Data

US 2003/0068417 A1 Apr. 10, 2003

Related U.S. Application Data

(63) Continuation-in-part of application No. 09/640,297, filed on Aug. 16, 2000, now Pat. No. 6,482,457.

(51) Int. Cl.
*A23L 1/20* (2006.01)
*A23L 1/212* (2006.01)
*A23P 1/00* (2006.01)
*A21D 8/00* (2006.01)

(52) U.S. Cl. ............... 426/242; 426/459; 426/634; 426/516; 426/518; 426/502; 426/503; 426/506; 426/464; 426/507; 426/508

(58) Field of Classification Search ............ 426/459, 426/634, 516, 518, 502, 503, 506, 464, 507, 426/508

See application file for complete search history.

(56) References Cited

U.S. PATENT DOCUMENTS

| 113,063 | A | 3/1871 | Kirkwood |
|---|---|---|---|
| 202,975 | A | 4/1878 | Andres |
| 1,011,730 | A | 12/1911 | Braunbeck |
| 1,088,741 | A | 3/1914 | Stephens |
| 1,509,076 | A | 9/1924 | Berczeller |
| 1,609,705 | A | 12/1926 | Forrest |
| 1,813,268 | A | 7/1931 | Bachler |
| 1,859,279 | A | 5/1932 | Chamberlain |
| 2,026,676 | A | 1/1936 | Gill |
| 2,279,280 | A | 4/1942 | Musher |
| 2,343,149 | A | 2/1944 | Krause, Jr. |
| 2,475,554 | A | 7/1949 | Müller |
| 2,489,267 | A | 11/1949 | Chapin et al. |
| 2,541,859 | A | 2/1951 | Callaghan et al. |
| 2,657,999 | A | 11/1953 | Rauch |
| 3,067,042 | A | 12/1962 | Pader |

(Continued)

FOREIGN PATENT DOCUMENTS

GB 562648 7/1944

(Continued)

OTHER PUBLICATIONS

Robert Noyes, "Dehydration Processes for Convenience Foods", 1969, Noyes Development Corporation, p. 237.

(Continued)

*Primary Examiner*—Anthony Weier
(74) *Attorney, Agent, or Firm*—Pillsbury Winthrop Shaw Pittman LLP (57) ABSTRACT

A method of preparing a reconstitutable, dehydrated whole bean product is shown. The method calls for utilizing a combination convection/microwave heating chamber to dry cooked whole beans in such a way as to preserve the integrity of the beans and, thus, significantly enhance the texture and quality of the bean product. The method requires a shorter amount of time than, and enables a significant reduction in the amount of bird mouthing that, is prevalent in existing methods.

43 Claims, 6 Drawing Sheets

U.S. PATENT DOCUMENTS

| | | | |
|---|---|---|---|
| 3,203,808 A * | 8/1965 | Thompson et al. | 426/442 |
| 3,253,930 A | 5/1966 | Gould et al. | |
| 3,275,458 A | 9/1966 | Willard, Jr. | |
| 3,290,159 A | 12/1966 | Dorsey et al. | |
| 3,291,615 A | 12/1966 | Thompson et al | |
| 3,317,324 A | 5/1967 | Austin et al. | |
| 3,388,998 A | 6/1968 | Ozai-Durrani | |
| 3,489,571 A | 1/1970 | Hannum | |
| 3,594,185 A | 7/1971 | Hawley et al. | |
| 3,594,186 A | 7/1971 | Hawley et al. | |
| 3,598,610 A | 8/1971 | Hawley et al. | |
| 3,787,595 A | 1/1974 | Folzenlogen et al. | |
| 4,015,341 A | 4/1977 | McKinney et al. | 34/4 |
| 4,022,919 A | 5/1977 | Comer | |
| 4,073,952 A | 2/1978 | Standing et al. | |
| 4,153,738 A | 5/1979 | Ronai et al. | |
| 4,184,420 A | 1/1980 | Podaras et al. | |
| 4,233,322 A | 11/1980 | Fritze | |
| 4,251,558 A | 2/1981 | Kobayashi et al. | |
| 4,273,796 A | 6/1981 | Maxcy et al. | |
| 4,295,419 A | 10/1981 | Langhammer | |
| 4,340,611 A | 7/1982 | McKinney et al. | 426/241 |
| 4,359,480 A | 11/1982 | Kock | |
| 4,372,984 A | 2/1983 | Bauer | |
| 4,400,402 A | 8/1983 | Vibbert et al. | |
| 4,407,840 A | 10/1983 | Lathrop et al. | |
| 4,470,343 A | 9/1984 | Didier | |
| 4,491,065 A | 1/1985 | Poulson | |
| 4,614,660 A | 9/1986 | Weibye | 426/461 |
| 4,614,665 A | 9/1986 | Furuya et al. | 426/634 |
| 4,632,833 A | 12/1986 | Gannon | 426/242 |
| 4,664,924 A | 5/1987 | Sugisawa et al. | |
| 4,676,990 A | 6/1987 | Huffman et al. | |
| 4,728,522 A | 3/1988 | Wear et al. | 426/242 |
| 4,735,816 A | 4/1988 | Sterner et al. | |
| 4,746,968 A | 5/1988 | Wear et al. | 219/10.55 |
| 4,748,038 A | 5/1988 | Lewis et al. | 426/456 |
| 4,770,893 A | 9/1988 | Kluge et al. | 426/637 |
| 4,785,726 A | 11/1988 | Wear et al. | 99/451 |
| 4,788,072 A | 11/1988 | Kawamura | |
| 4,795,651 A | 1/1989 | Henderson et al. | |
| 4,810,513 A | 3/1989 | Van Liere | 426/465 |
| 4,810,517 A | 3/1989 | Glittenberg et al. | |
| 4,818,558 A | 4/1989 | Hartman et al. | |
| 4,828,902 A | 5/1989 | Welygan et al. | |
| 4,853,248 A | 8/1989 | Würsch et al. | |
| 4,857,357 A | 8/1989 | Ammann | 426/634 |
| 4,871,567 A | 10/1989 | Sterner et al. | |
| 4,889,734 A | 12/1989 | Shatila | |
| 4,900,578 A | 2/1990 | Bakker et al. | |
| 4,923,710 A | 5/1990 | van der Marel | 426/634 |
| 5,020,237 A | 6/1991 | Gross et al. | |
| 5,089,281 A | 2/1992 | Baz et al. | 426/461 |
| 5,097,754 A | 3/1992 | Covington et al. | |
| 5,124,170 A | 6/1992 | Sterner et al. | |
| 5,130,153 A | 7/1992 | McIlroy et al. | |
| 5,132,127 A | 7/1992 | Wisdom | |
| 5,132,133 A | 7/1992 | Huber et al. | 426/241 |
| 5,158,066 A | 10/1992 | Dodgen | |
| 5,213,831 A | 5/1993 | Leggott et al. | |
| 5,296,253 A | 3/1994 | Lusas et al. | |
| 5,322,007 A | 6/1994 | Caridis et al. | |
| 5,431,093 A | 7/1995 | Dodgen | |
| 5,556,657 A | 9/1996 | Akazaki et al. | 426/241 |
| 5,598,769 A | 2/1997 | Luebke et al. | |
| 5,662,029 A | 9/1997 | Ubert et al. | |
| 5,704,278 A | 1/1998 | Cross | |
| 5,707,671 A | 1/1998 | Beck et al. | |
| 5,725,902 A | 3/1998 | Lesueur-Brymer et al. | |
| 5,744,188 A | 4/1998 | Kolla et al. | |
| 5,786,021 A | 7/1998 | Satoh et al. | |
| 5,863,592 A | 1/1999 | Sterner et al. | |
| 5,871,801 A | 2/1999 | Kazemzadeh | |
| 5,902,629 A | 5/1999 | Baker et al. | |
| 5,972,397 A | 10/1999 | Durance et al. | |
| 5,972,413 A | 10/1999 | Whitney et al. | 426/618 |
| 5,980,971 A | 11/1999 | Walsh | |
| 6,004,590 A | 12/1999 | Subramaniam et al. | |
| 6,013,296 A | 1/2000 | Kester et al. | |
| 6,027,757 A | 2/2000 | Menon | |
| 6,086,933 A | 7/2000 | Rockstrom | |
| 6,090,433 A | 7/2000 | Sterner et al. | |
| 6,183,798 B1 | 2/2001 | Ishii | 426/507 |
| 6,197,358 B1 | 3/2001 | Bunker | |
| 6,220,150 B1 | 4/2001 | Margolis | |
| 6,238,725 B1 | 5/2001 | Bush et al. | 426/634 |
| 6,274,189 B1 | 8/2001 | Kazemzadeh | |
| 6,287,626 B1 | 9/2001 | Fox | 426/615 |
| 6,312,747 B1 | 11/2001 | Villagran et al. | |
| 6,340,494 B1 | 1/2002 | Klukowski et al. | |
| 6,355,291 B1 | 3/2002 | Rose et al. | 426/341 |
| 6,465,031 B1 | 10/2002 | Bush et al. | 426/486 |
| 6,482,457 B1 | 11/2002 | Margolis | |
| 6,589,589 B1 | 7/2003 | Whalen | 426/242 |
| 6,599,547 B1 | 7/2003 | Martinez-Serna Villagran et al. | 426/242 |
| 6,602,534 B1 | 8/2003 | Rose et al. | 426/507 |
| 6,602,539 B1 | 8/2003 | Stubbs et al. | |
| 6,706,298 B1 | 3/2004 | Villagran et al. | 426/241 |
| 2002/0127283 A1 | 9/2002 | Sterner et al. | |
| 2004/0081730 A1 | 4/2004 | Drozd et al. | 426/241 |

FOREIGN PATENT DOCUMENTS

| | | |
|---|---|---|
| GB | 648373 | 1/1951 |
| GB | 783974 | 10/1957 |
| GB | 938381 | 10/1963 |
| GB | 1017519 | 1/1966 |
| GB | 2118421 | 11/1983 |
| GB | 2163938 | 3/1986 |

OTHER PUBLICATIONS

M.R. Molina, et al., "Heat Treatment: A Process to Control the Development of the Hard-to-Cook Phenomenon in Black Beans (*Phaseolus vulgaris*)," 1976, Journal of Food Science, vol. 41, pp. 661-666.

H.J. Morris, et al., "Processing Quality of Varieties and Strains of Dry Beans," Jun. 1950, Food Technology, pp. 247-251.

Derwent Abstract—Acc. No. 1996-127368 for Ru 2038797 published Jul. 9, 1995. Inventors: Doenko et al.

* cited by examiner

METHOD FOR PRODUCING A DEHYDRATED WHOLE FOOD PRODUCT

RELATED APPLICATION DATA

This is a continuation-in-part of Ser. No. 09/640,297, filed Aug. 16, 2000, now U.S. Pat. No. 6,482,457.

BACKGROUND OF THE INVENTION

1. Field of the Invention

This invention is in the field of food products and, more particularly, directed to a method for producing a dehydrated food product, including whole cooked bean (and other such similar) products in such a way as to preserve the structural integrity of the bean which, in turn, helps provide a food product having significantly enhanced texture and quality.

2. Background

The prevalence of fast-food style establishments in recent years has been accompanied by an increased demand for reconstitutable food products, such as, for example, dehydrated refried beans. From an economic point of view, such products have several advantages. For example, each establishment can buy and store the product in bulk quantities without the risk of spoilage. Also, since the product is normally reconstituted in a matter of minutes by adding only water, there are savings in time, energy, and labor associated with the use of these products. Finally, since there is no need to continually prepare the food product in the conventional manner (i.e., to make the food fresh, and on a daily basis), there is also no need for each establishment to keep extra equipment (e.g., cookware, etc.) on the premises. As such, methods have been devised to produce reconstitutable food products that, ideally, could be prepared very quickly, and would have the taste, texture, and appearance of their conventionally-prepared counterparts.

Current methods and apparati for producing such food products and, more specifically, refried bean products, require that one consider various factors. For example, to satisfy the requirement that the raw beans be mixed as they are hydrated and, also, as they are cooked, a number of the methods presently known employ rotating vessels. Vessels that rotate are used so that the beans can be contacted with a small amount of water that is diminishing as the water is absorbed by the beans. Controlled amounts of water are used during the cooking process in hopes that at the end, little or no water remains—only the cooked, hydrated beans. This is difficult to achieve, and the art has searched for various methods, as excess water can result in yield loss (some of the beans will dissolve into the water) and/or a pasty product that is difficult to further process and dry. Merely placing the beans in water has other shortcomings. For example, such a method can result in some beans becoming too soft, while others do not become properly hydrated. Further, prior art vessels are generally quite bulky, which not only translates into added and more-frequent maintenance requirements, but also makes it more difficult to achieve economies of scale. Further still, generally, in many prior art vessels only a small amount of beans can be treated. In other words, to achieve the benefit of a small water-to-bean ratio, rotating vessels of particular configurations and having limited capacities were used. Even then, it is difficult to control the water absorption into the beans.

Yet other shortcomings relate to the starting materials that are used. In a typical prior art process for preparing refried beans, dry, raw beans are placed into the vessel, and a small quantity of water is added. Unless the vessel rotates, the beans on the top of the pile could absorb a different amount of water as compared to the beans at a position lower down. Further, as the water level in the vessel decreases, yet further non-uniform water absorption throughout the beans could result. It is known that raw beans typically have an initial moisture content in the range 6%–14%. However, current methods have difficulty using a batch of raw material that spans this entire range because the disparity in initial moisture levels exacerbates the variations in water absorption during hydration with small amounts of water, which would, in turn, result in a non-uniform final product. As such, in order to use many prior art methods and apparatuses, the practitioner is limited to using rotating vessels and to batches of raw materials, each of which falls within a small sub-group of initial moisture-content ranges (e.g., those in the 6–8% range, or those in the 10–12% range, etc.).

In the current state of the art, there are also disadvantages associated with the end product itself (e.g., with the dehydrated bean product). For example, even though one goal of dehydrated food products is to allow for rapid water take-up at reconstitution, this goal is only partially met in current dehydrated bean products. As is known in the art, most current methods produce products that are either in the shape of small pellets or in the shape of flakes or in the shape of fine powder. In the case of pellets, because of the way in which the final product is prepared, typically only a small portion of the surface area of each pellet (i.e., typically, the two ends of each pellet) provides areas through which water can easily be absorbed; the remainder of the pellet's outer surface is inefficient in absorbing water. Flakes, on the other hand, due to their method of manufacture, have a harder outer surface and are generally treated with oil on their surface, which is a water repellent, so that water take-up upon reconstitution is actually slower than it may be otherwise. Therefore, in both cases, water absorption rates are not optimal.

Moreover, upon reconstitution, many of the dehydrated products currently available turn into paste-like, or other similar, uniform compositions, where there is generally a lack of texture in the food. This is especially true with methods and apparatuses that produce a granular, rather than a pelletized, or flake-like, dehydrated product. In addition, regardless of the actual shape and form of the final product, there is no simple provision in existing methods and apparatuses for varying (i.e., custom making) the texture of the final product as desired.

Reference is made to U.S. Pat. Nos. 4,676,990, 4,735,816, and 4,871,567 as further examples of the prior art. These references illustrate various bean-making processes, but all have a number of shortcomings. For example, in the '990 patent, a pelletized product is produced by particularized processing steps and related apparatus. In the '816 and '567 patents, a thin, flake-like product is produced by means of yet other particularized processing steps and apparatus. These processes are complicated and the final products are only marginally close to refried beans made to have a pleasant texture with a desired amount of bean particulates.

To address some of the issues relating to the lack of adequate texture in the reconstituted food, attempts have been made in the prior art to add dehydrated whole beans to the aforementioned products. However, such attempts have been met with difficulties as dehydration of cooked whole beans has generally been accompanied by a considerable amount of "bird mouthing".

Bird mouthing, also referred to as "butterflying", is a phenomenon wherein the whole bean splits along its two halves and opens during the dehydration process. It is believed that bird mouthing is caused by a differential rate of drying between the bean skin and cotyledon, such that, during the dehydration process, the bean skin dries more rapidly than the cotyledon, and thus, contracts (a condition which is referred to as "case hardening"). As dehydration continues, the slower-drying cotyledon develops internal vapor pressure to an extent where the pressure ruptures the skin and causes bird mouthing.

Reference is made to U.S. Pat. Nos. 3,290,159 and 4,871,567 as examples of the prior art's attempts to reduce the amount of bird mouthing in dehydration of whole beans. For example, the '159 patent discloses a two-stage dehydration process, wherein the first stage involves a slower moisture-removal process, and the second stage involves a more rapid dehydration process. Both stages of the disclosed methodology are directed to drying using conventional air dryers. Similarly, the '567 patent discloses a dehydration process comprising two or more "stages". However, in contrast to the '159 patent, the '567 patent teaches a method involving incremental decreases, rather than increases, in the amount of heat supplied during the dehydration process. Nevertheless, neither methodology seems to have resolved, to an appreciable degree, the problem of bird mouthing.

An additional drawback associated with the process disclosed in the '159 patent is that, in order to be effective, the process calls for slow drying rates. Such slow drying rates translate into relatively long drying times (e.g., on the order of 4–6 hours) which, in turn, result in low levels of throughput per unit time. Similarly, the process disclosed in the '567 patent calls for an initial period of high-humidity drying which, again, results in longer drying times. This is especially true when convective heating is utilized to dry the beans since convective dehydration efficiency drops off drastically during the latter stages of drying particulate material when moisture diffusion from the center of the particle controls the drying rate.

Food manufacturers have also used equipment and/or forms of energy other than conventional air dryers to produce dehydrated food products. In this regard, reference is made to U.S. Pat. Nos. 4,073,952 and 6,197,358. The '952 patent discloses a method of making dehydrated potatoes, wherein the method includes drying pieces of potato by exposing them simultaneously to microwave energy and to hot air. The hot air is enriched with moisture to maintain an average humidity of at least 83% in the oven during most of the drying period. In addition, about 10–50% of the energy used for drying is provided by moisture-enriched air that is heated to between 75 and 255° F. and, typically, to 100–150° F.

However, being unrelated to the production of dehydrated bean products, the '952 patent does not address bird mouthing at all. Rather, it teaches a combination microwave/hot air drying process in order to minimize discoloration and loss of flavor for potato pieces. Similarly, the '358 patent is related to a process in which microwave energy may be used during the production of dehydrated potato products, but not during the drying step.

The features and advantages of the present invention will become more apparent through the following description. It should be understood, however, that the detailed description and specific examples, while indicating particular embodiments of the invention, are given by way of illustration only and various modifications may naturally be performed without deviating from the spirit of the present invention.

DETAILED DESCRIPTION

An embodiment of the present invention is related to a method or process for producing a reconstitutable, dehydrated food product, which may be practiced by use of apparatus comprising a stationary hydration/cooking vessel, a chopping system, and a forming mechanism. The hydration/cooking vessel is equipped with a perforated internal baffle which rotates continuously to ensure contacting of all beans or other foods with a small and continuous diminishing quantity of water; the baffle holes ensure that fluids within the vessel are exchanged freely between the two chambers of the vessel as defined by the baffle. Once cooked, the beans are transferred to the chopping system, wherein they are urged through a channel, comprising a rotating blade that chops, and a perforated plate that re-sizes, the beans into a texturized composition. The blade speed and the size of the holes in the perforated plate can be changed in order to achieve different textures within the composition. The latter is then treated in a forming mechanism, comprising a shaped conduit, wherein the composition is formed into a generally flat sheet, which is then treated so as to produce an improved reconstitutable dehydrated bean product. In certain embodiments, the generally flat sheet may be ribbed, or ridged, on either, or both, of its top and bottom surfaces.

The stationary hydration/cooling vessel of the present invention has significant processing advantages. First, since the vessel is stationary, it is relatively simple to construct large units which result in substantial economies of scale. Second, by using a horizontal cooking vessel with a perforated internal baffle having a length and width that are substantially the same as the vessel, it is easy to assure that, during processing, all of the beans are gently and continuously contacted with a small, and diminishing quantity of liquid.

Embodiments of the present invention are directed to a method of preparing a reconstitutable, dehydrated food product by means of hydrating and cooking raw beans, so that all of the cooked beans achieve a similar moisture content, chopping the cooked beans and forming the chopped beans into a flat sheet of texturized composition, drying the sheet, and breaking the sheet into smaller pieces.

The above-described process, particularly the sequence involving the latter three steps, results in a dehydrated bean product that absorbs water faster and more uniformly upon reconstitution. Also, after the raw beans have been hydrated, excess liquid can be, if desired, removed from the vessel, thus eliminating some flatulent sugars from, and improving the digestibility of, the final bean product. Moreover, salt, colorant, and other flavoring may be added to a portion of the removed excess water and then added back to the vessel before the beans are cooked. Alternatively, salt, colorant, flavoring, and oil may be added during the chopping, or other steps, of the above-described process. Finally, depending on the desired texture and chunkiness of the final product, a portion of cooked whole beans may be removed before the chopping step, and then added to the beans in a subsequent step, or after drying to the final product upon reconstitution; alternatively, whole beans may be independently cooked, flavored, and dried, and then mixed with dehydrated small pieces of chopped beans produced separately.

Figure 1:
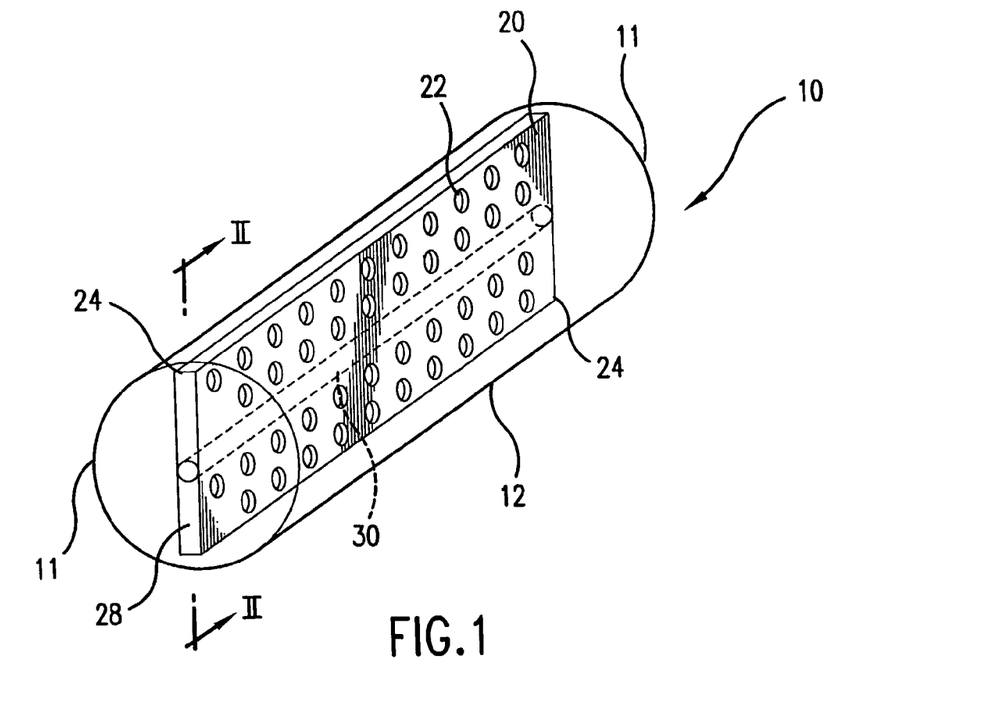
FIG. 1 shows an illustration of a vessel and rotating member of an apparatus that may be used in the practice of an embodiment of the invention.
Figure 4:
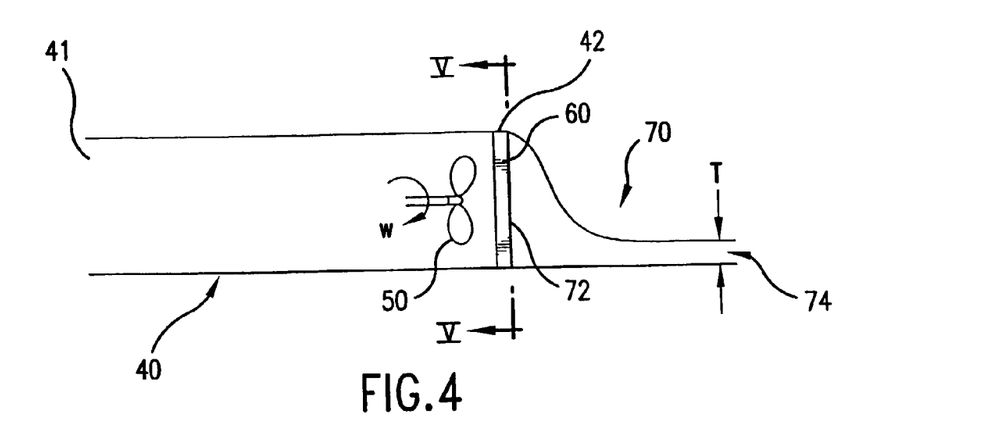
FIG. 4 shows an illustration of a channel and forming conduit of an apparatus that may be used in the practice of an embodiment of the invention.

FIGS. 1 and 4 show one embodiment of the apparati which may be used to practice the invention. As shown in these figures, a stationary vessel 10 comprises a vessel shell 12, and a central shaft 30. Although the figures show that the vessel 10 has a substantially circular cross-section, this is done for purposes of demonstration only, and it is intended that the invention encompass other vessel configurations as well.

The vessel 10 is also equipped with a solid-blade baffle 20, which is attached to, and rotates around, shaft 30. In the preferred embodiment, baffle 20 has a length and width that are substantially as long as the length and width, respectively, of the vessel 10. Therefore, in the embodiment of FIGS. 1 and 2, the width of the baffle 20 is substantially commensurate with the diameter of a cross-section of the vessel 10. To ensure proper operation, a clearance of less than 3/16 inch is maintained between the inner surface 18 of the shell 12 and an edge 24 of the baffle 20, as well as between an end 28 of the baffle 20 and an end 11 of the vessel 10.

Figure 2:
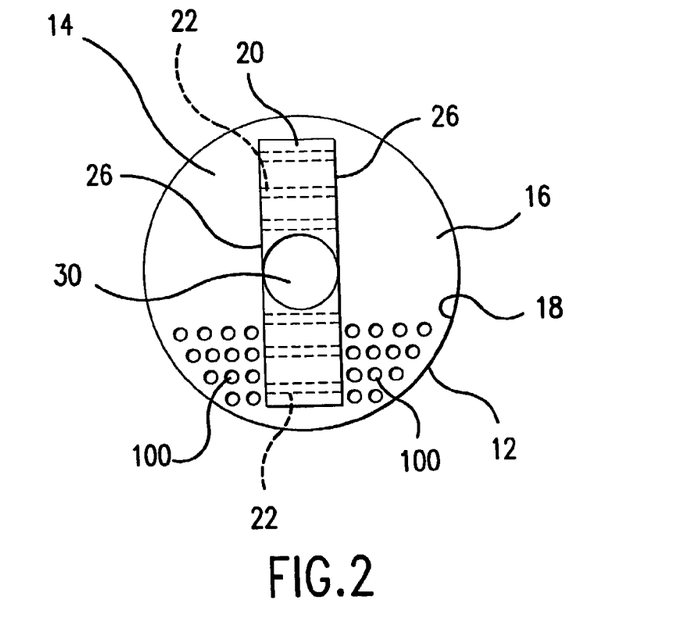
FIG. 2 shows a cross-sectional view of the vessel and rotating member of FIG. 1, taken along line II—II.

As is shown in FIG. 2, at any point in time, the baffle 20 divides the inner space of the vessel 10 into two chambers, 14 and 16, where each chamber is defined substantially by the space between the inner surface 18 of the vessel shell 12, and a wall 26 of the baffle 20. The solid-blade baffle 20 has transverse holes 22 (shown in FIG. 1, and by dashed lines in FIG. 2) which, while large enough to allow fluids within the vessel 10 to travel between the chambers 14 and 16, are small enough to keep the vessel contents 100 separated on each side of the baffle 20.

Figure 3:
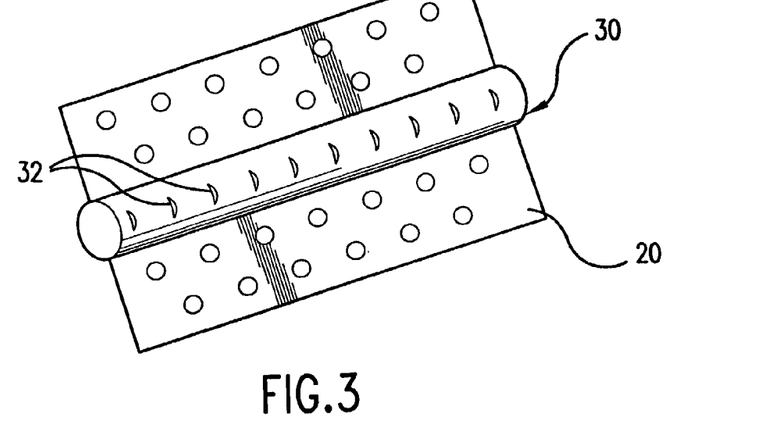
FIG. 3 shows an illustration of a shaft and rotating member of an embodiment of the vessel.

In a preferred embodiment, the vessel 10 is employed both to hydrate raw beans and to cook the hydrated beans. As will be explained in detail below, when used in the latter capacity, the vessel 10 is transformed into a pressure cooker, using steam to cook the beans. To achieve uniform steam injection into the chambers 14 and 16, steam is forced through the shaft 30, and enters each chamber 14, 16 through steam outlets 32 which are arranged along the length of the shaft 30 (FIG. 3). However, steam can also be injected into the vessel through other suitably placed entrances to the vessel.

Figure 5:
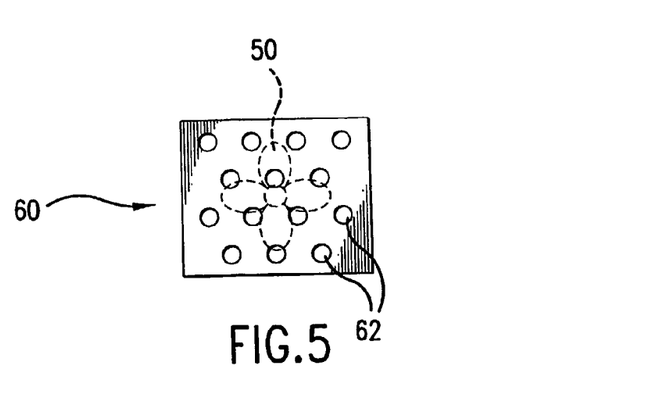
FIG. 5 shows a cross-sectional view of the channel and forming conduit of FIG. 4, taken along line V—V.

FIG. 4 depicts the remaining components of an embodiment of the invention. Channel 40 is an elongated hollow structure which is equipped with a rotating blade 50 and a perforated plate 60 adjacent its distal end 42. The proximal end 41 of the channel is located adjacent the vessel 10 and receives the cooked beans from the vessel 10. Once received, the beans are urged through the channel by a piston or other suitable mechanism, such as a rotating shaft with advancing flights. Therefore, as the blade 50 rotates, it chops cooked beans into pieces, which are then urged through the holes 62 of perforated plate 60 (FIG. 5). It is noted that, although the plate 60 is shown to have a rectangular cross-section, the present invention is not intended to be limited to this configuration; rather, both the plate 60 and the channel 40 may have cross-sections of various geometries. Moreover, the rotating blade 50 and perforated plate 60 may be disposed at other locations along the longitudinal axis of the channel 40.

The channel 40 is adjacent to, and in flow communication with, a forming conduit 70, which comprises an inlet 72 and an outlet 74. As is explained in more detail below, chopped beans exit the outlet 74 in a flat sheet of textured composition, where the flat sheet has a generally rectangular cross-section. The thickness and shape of the sheet are determined by the conduit outlet 74.

Figure 9A:
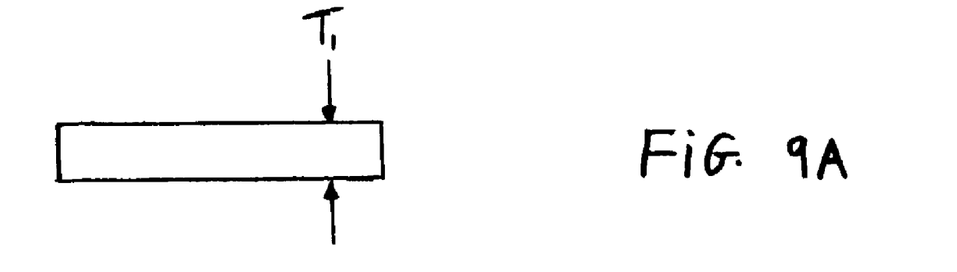
FIGS. 9A–9C show various cross-sections of a sheet of textured material according to an embodiment of the invention.
Figure 9B:
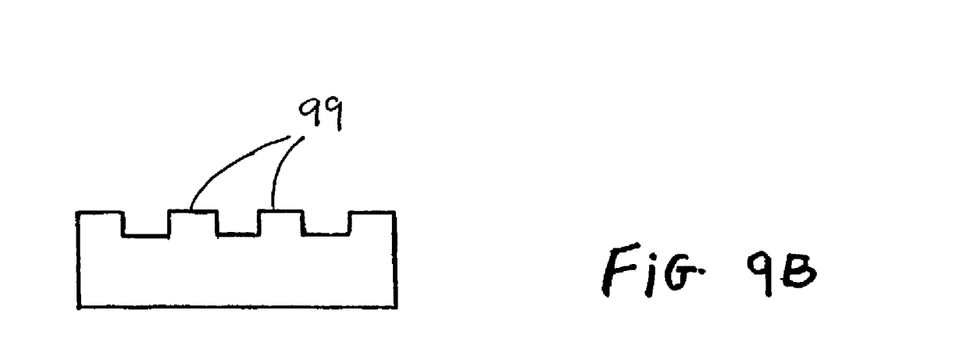
Figure 9C:
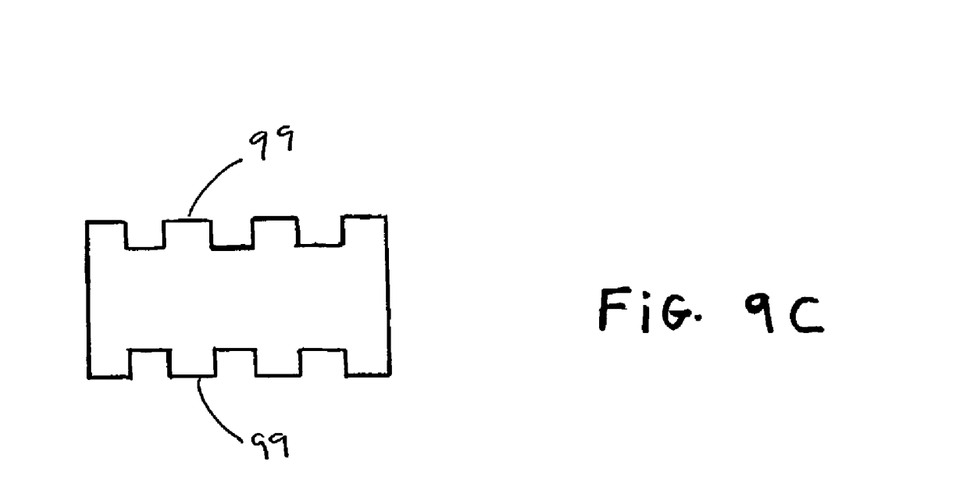

More specifically, FIGS. 9A–9C show various cross-sections of the sheet of textured material. For example, where the outlet 74 of the forming conduit 70 has a rectangular cross-section of thickness T (see FIG. 4), a generally flat sheet of textured composition is produced that also has a generally rectangular cross-section, with thickness $T_1$ (see FIG. 9A), where the magnitude of $T_1$ may be slightly less than the magnitude of T. On the other hand, the outlet 74 may have ridges, or ribs, on its top and/or bottom surface(s). As shown in FIGS. 9B and 9C, this will result in a sheet of texturized composition that also has ridges (or ribs) 99 running longitudinally on its top and/or bottom surface(s).

It is noted that the cross-sectional configuration of the sheet of texturized composition is generally determined by striking a balance between throughput and drying efficiency. That is, on the one hand, the thicker the sheet of texturized composition, the higher the amount of beans that can be processed for a given speed through the forming conduit 70. On the other hand, the thicker the sheet of texturized composition, the higher the required amount of time for exposure to heat (or other drying mechanism) which, in turn, translates into a slower processing speed—or, put another way, if the speed is kept constant, then a thicker sheet of composition may not be sufficiently dried. In this regard, experimental results indicate that, in a preferred embodiment, all sections of the sheet are typically less than about ¼ inch thick.

Figure 6:
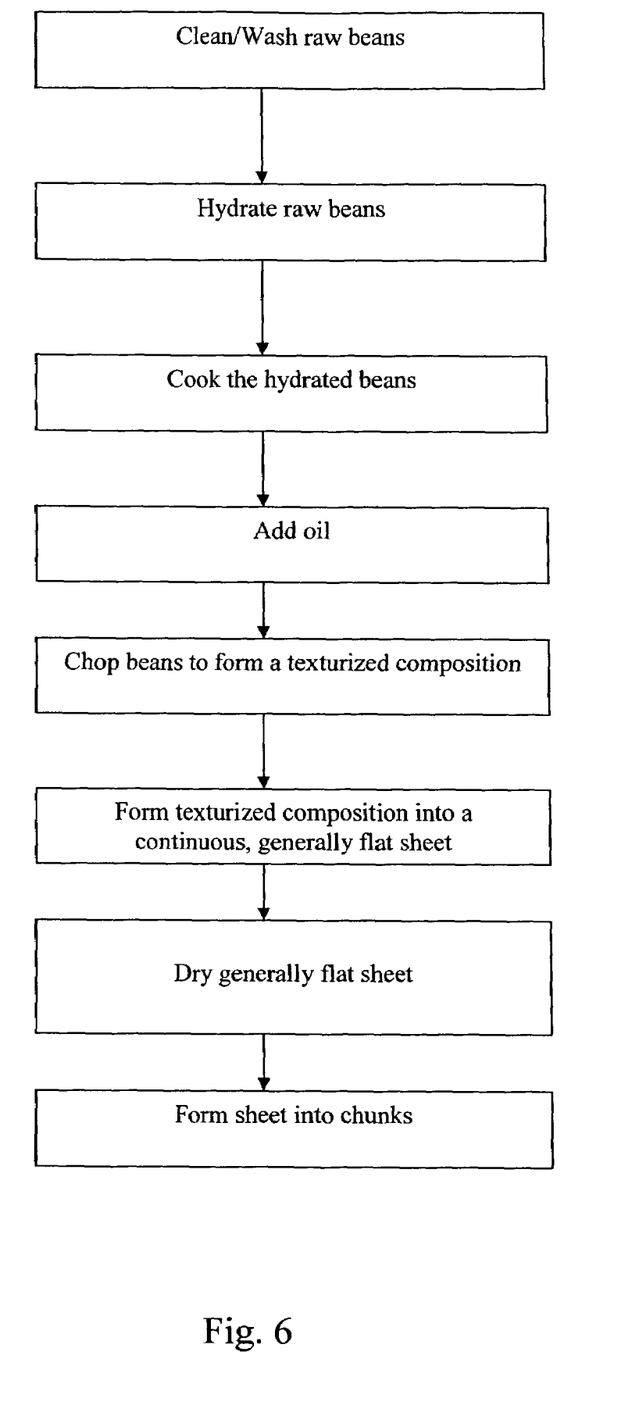
FIG. 6 shows a condensed flow-chart format of an embodiment of the invention.

FIG. 6 shows, in condensed flow-chart format, an embodiment of a method of the invention. In practice, raw whole beans are cleaned, washed, and placed into chambers 14 and 16 of stationary vessel 10, on either side of the baffle 20. Water is then added to the vessel 10 in an amount that is at least equal in weight to the weight of the beans in the vessel. Although, in principle, the beans could be hydrated by just allowing them to soak in the water for a period of time, experience has shown that this practice results in non-uniform water absorption by the beans. That is, over time, as the beans on the top of the pile absorb water, the water level in the vessel decreases, which causes non-uniform water absorption throughout the pile of beans.

On the other hand, it is known that raw beans typically have an initial moisture content in the range 6%–14%. However, given their non-uniform hydration procedures, prior-art methods cannot use a batch of raw materials that includes beans and legumes from this entire range because the disparity in initial moisture levels may exacerbate the variations in water absorption during hydration, so that the result would be a highly non-uniform final product. As such, for every batch of raw materials, the prior art is limited to using raw beans that fall within a small range of initial moisture content, e.g., 6–8%, or 12–14%. The present invention, however, is not so limited.

In a preferred embodiment, once water has been added to the raw beans in the vessel 10, the baffle 20 is activated, and the beans are hydrated at atmospheric pressure and a temperature between 150° F. and 200° F. By rotating around the central shaft 30, the baffle 20 continuously brings the beans into contact with water, so that the beans do not generally remain in one place throughout the hydration step. That is, the beans are continuously replaced from the top to the bottom, and vice versa. In addition, the holes 22 of the baffle 20 ensure that water is exchanged between the chambers 14 and 16, so that the hydrating water is not stationary either, and reaches the beans in both chambers. The combination of the rotating baffle 20 and the water exchange between the chambers 14 and 16 allows the moisture level in all of the beans to equilibrate to about the same level. Typically, during the hydration step, the beans absorb between 50% and 80% of the water that they are capable of absorbing.

In a preferred embodiment, the legumes are cooked using direct steam injection. Therefore, there is no need to have any water in the vessel 10 while the beans are being cooked. Thus, once the beans have been properly hydrated, any excess water can be removed from the vessel 10. There is, however, an added advantage to removing excess water, namely, that flatulent sugars are also removed along with the excess water, which results in improved digestibility of the final bean product.

An option, at this point, is to add salt or other flavoring, colorant, or oil to a portion of the removed water, and then return the combination to the vessel 10. In cases where this is done, a relatively small amount of water is added back to the vessel 10, so that it is generally insufficient to cover all of the beans in both chambers 14, 16. Also, either as a substitute for, or a supplement to, this option, oil, colorant, salt, and/or other flavoring may be added at various other steps within the process (e.g., after cooking or during the chopping step).

Using direct steam injection, the vessel 10 is now pressurized above atmospheric pressure, and the beans are cooked at a temperature greater than 212° F. Specifically, steam is injected into the vessel 10 and chambers 14 and 16. During the cooking step, the baffle 20 rotates around the central shaft 30 as it did during the hydration step, thus continuously contacting beans in each chamber 14, 16 with the small amount of water that rests at the bottom of the stationary cooling vessel. At the end of the cooking step, there is little or no water left in the vessel, and the beans are removed and transferred to the channel 40.

Within channel 40, the cooked beans are urged towards the distal end 42 via the piston/rotating shaft. As the beans are urged forward, they are chopped by a rotating blade 50, which rotates at an angular velocity $\omega$. The beans are then pushed through the holes 62 of the perforated plate 60, which is located distal to the rotating blade 50 and resizes the chopped beans as they travel past the plate. In this way, a texturized composition is created, wherein the texture, or chunkiness, of the composition (and of the final bean product) is determined by the angular velocity (s of the blade 50 and the hole sizes of the plate 60. Therefore, the present invention offers the capability of varying-the texture of the final bean product to a desired consistency by changing the blade angular velocity $\omega$, the size of the plate holes 62, or both.

The chopped beans are next fed through the forming conduit 70. As shown in FIG. 4, in a preferred embodiment, the inlet 72 of the forming conduit 70 is connected to the distal end 42 of the channel 40. However, this is not required, as long as the conduit 70 and the channel 40 are in flow communication, so that chopped beans exiting the channel from its distal end 42 flow into the forming conduit through its inlet 72. For example, the inlet 72 may comprise a hopper, or other inlet configuration, that is situated within close proximity of, but not necessarily connected to, the channel 40. Regardless, once the chopped beans are in the conduit 70, they are urged towards the conduit outlet 74. The outlet 74 has a generally rectangular cross-section which, as was described previously, may have ridges on its top and/or bottom surface(s), a thickness T, and a width that is considerably larger than T. Therefore, as the texturized composition exits the conduit outlet 74, it is formed into a generally flat, continuous elongated sheet of rectangular cross-section that may have ridges 99 on its top and/or bottom surface(s).

The elongated sheet of texturized composition is next dried (e.g., to a final moisture content of about 10%) and then broken up, or formed, into chunks, where each chunk is approximately 0.25 to 0.50 inch in size. Alternatively, the bean sheet may be first partially dried, then formed into chunks which are then completely dried.

In either case, chunks of dehydrated bean product are produced that have rough, uneven, and porous edges. Moreover, each chunk has a larger surface area containing these rough edges than do bean products prepared according to prior-art methods. This translates into pieces with porous edges that take up and absorb water much more easily and quickly upon rehydration than is available in the prior art.

Figure 7:
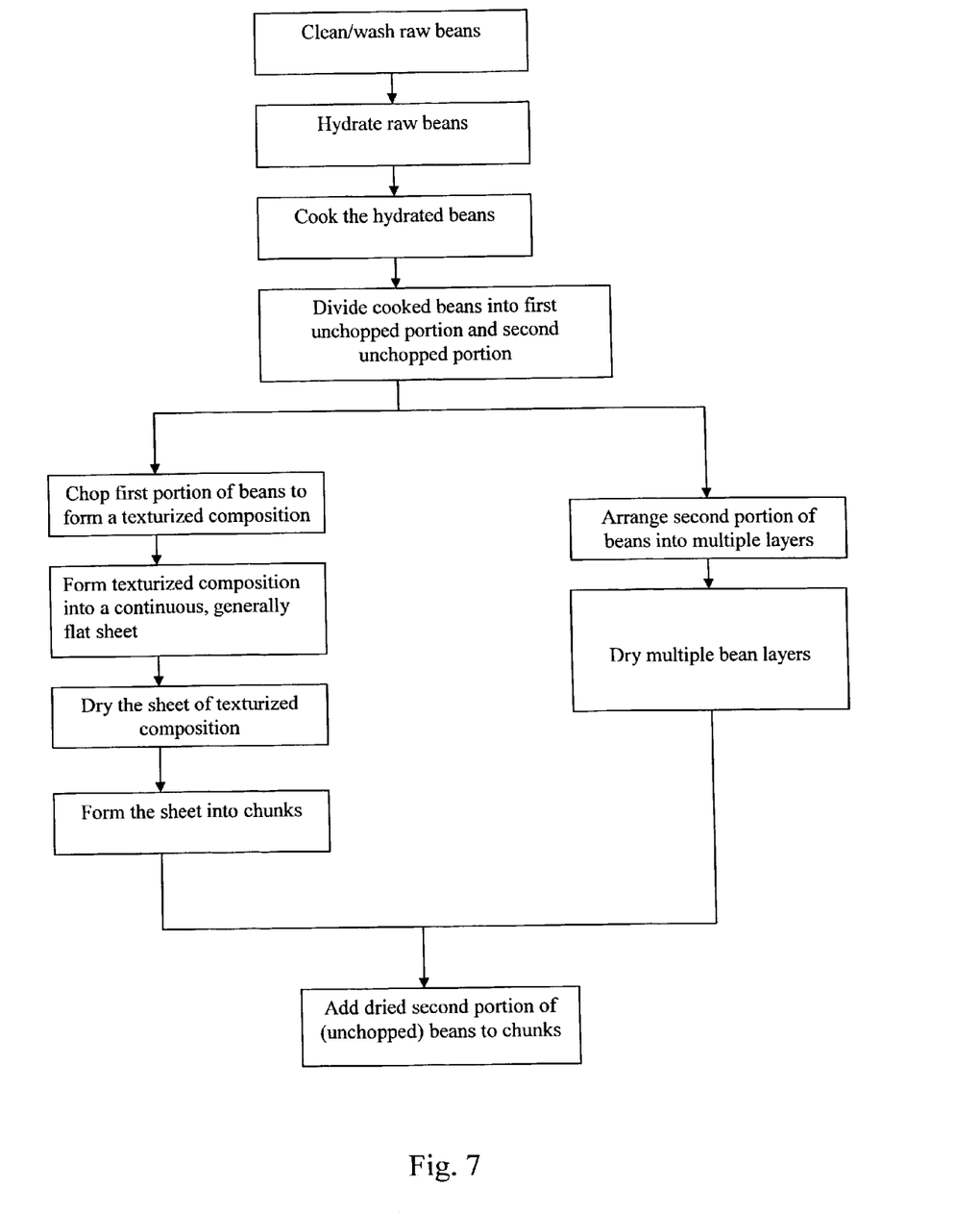
FIG. 7 shows a condensed flow-chart format of an alternative embodiment of the invention.

As shown in FIG. 7, an alternative embodiment of the method disclosed herein may include the following steps: After the beans are cooked in the vessel 10, they are divided into a first unchopped portion and a second unchopped portion. The first portion is then taken through the remainder of the process as before, while the second portion is kept separate. That is, the beans in the first portion are chopped in the channel 40, and then formed into a sheet of texturized composition in the forming conduit 70. The entire sheet is then dried and broken up into chunks. Beans from the second portion, which remained unchopped, are separately dried and added to the broken-up chunks (from the first portion).

Figure 8:
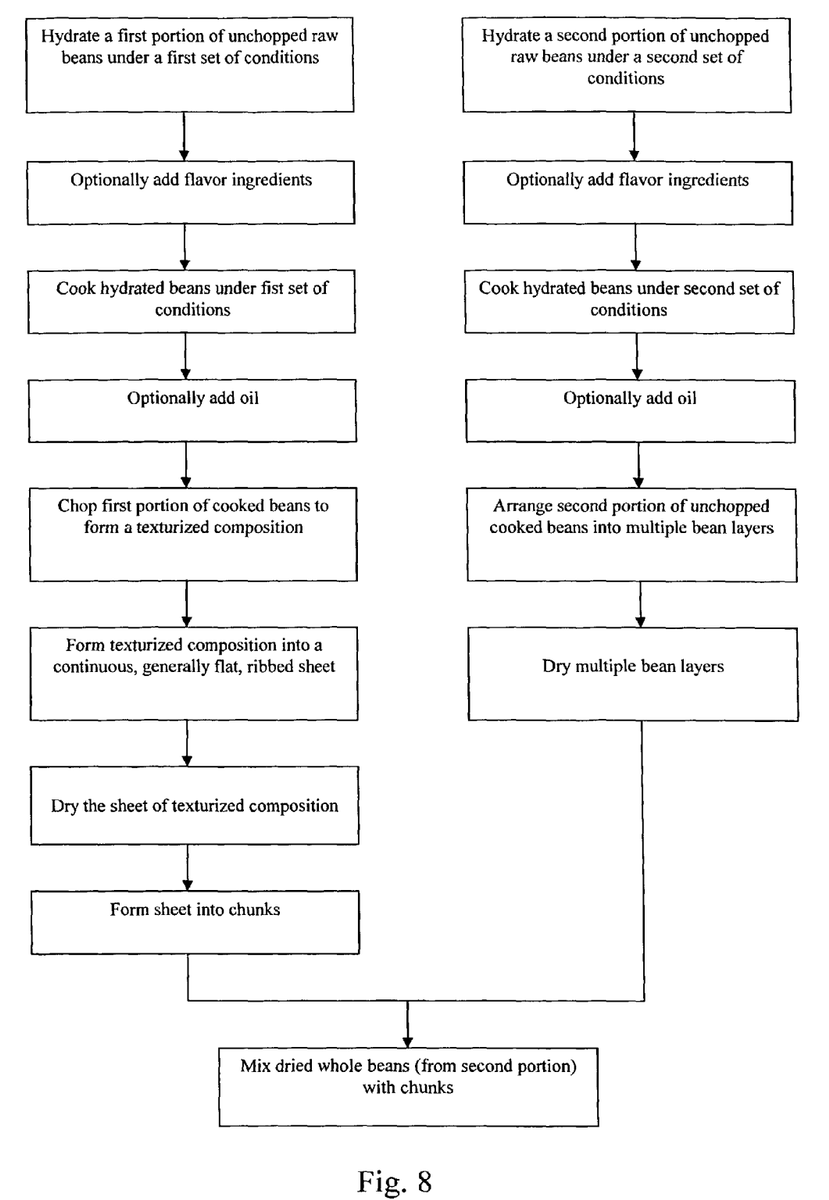
FIG. 8 shows a condensed flow-chart format of an additional embodiment of the invention.

Alternatively, separate portions of beans, e.g., those destined to be chopped and those that are maintained whole, may even be hydrated and cooked using different processing conditions (e.g., using different hydration times, different cooking temperatures, etc. to make the chopped beans more tender than the whole beans), and then processed and combined as indicated above (see FIG. 8).

Overall, these alternative embodiments allow for added control over the texture and composition of the final dehydrated bean product.

Examples set forth below further illustrate various aspects of the present invention:

EXAMPLE 1

12 liters of hot water were placed in a small (8 inch diameter by 24 inch long) horizontal cylindrical cooking vessel. The water was then further heated to 185° F. by passing steam through the shaft of the central baffle, while slowly rotating the baffle so as to agitate the water.

Approximately 4000 ml of the hot water was drained from the vessel, and 7 lb. of dry pinto beans were then placed in the vessel—one half of these beans being distributed along one side of the baffle, and the remaining half on the other side of the baffle.

The vessel was then maintained at atmospheric pressure, and the baffle was alternately and continuously slowly rotated for one (1) minute each in the clockwise and counterclockwise directions. Steam was added through the baffle shaft to maintain the bean/water mixture temperature between approximately 180° F. and 190° F. The beans immediately started to absorb the hot water, and the rotating baffle served to mix and contact the beans with a continuously diminishing quantity of water. This hydration step was continued for 20 minutes, after which approximately 6700 ml of broth was drained from the now partially-hydrated beans. 75 grams of salt was then dissolved in 600 ml of the drained broth and this salt solution was returned to the cooking vessel.

The hatch to the cooking vessel was now secured and the vessel pressurized with steam and held at a pressure of 10 psig for 40 minutes in order to cook the beans. During this cooking period, the cooking vessel baffle continued to rotate alternatively and slowly for one (1) minute each in the clockwise and counterclockwise directions. In this manner, all the beans were contacted with the remaining and continuously reducing broth volume.

At the end of the cooking step, the vessel was depressurized and the cooked beans with very little remaining liquid broth were discharged into a holding vessel.

These cooked beans were then chopped and texturized by a small electrically driven meat grinder, which had a front plate with ¼ inch holes and knife cutters which rotated against the inner side of the front plate.

The cooked beans were manually fed into the grinder and the textured bean mass collected as it exited through the grinder front plate.

The textured bean mass was then placed in a cylindrical vessel, and was shaped into a sheet approximately ⅛ inch in thickness and 4 inches wide by applying pressure to the vessel so as to force the bean mass through a ⅛ inch by 4 inch slot situated at the base of the vessel.

As the textured bean mass exited the slot, it was continuously deposited on 6-inch by 6-inch perforated metal squares.

These perforated metal squares, supporting the wet bean sheet, were transferred and placed on a conveyor that passes through a convective dryer.

The bean sheet was initially dried for 3 minutes and 45 seconds using 400° F. hot air impinging on the top and bottom of the bean sheet.

The partially-dried beans were then broken into smaller pieces, placed on the perforated metal supporting squares, and finally dried for 4 minutes in the same convective dryer using 350° F. hot air.

After cooling, these dried, textured beans were stored for rapid reconstitution with water, and subsequent use in food items.

It will be apparent to a person of ordinary skill in the art that embodiments of the present invention are not limited in their design or application to specific embodiments disclosed herein. For example, injection of steam into the stationary pressure vessel may be accomplished through ports in the vessel walls. Alternatively, recirculating water, rather than directly-injected steam, may be used to cook the beans.

Embodiments of the present invention are also directed to a method of preparing a reconstitutable, dehydrated whole bean product in such a way as to preserve the structural integrity of the whole beans which, in turn, would significantly enhance the texture and quality of the bean product. As has been set forth above, such a method must address, and significantly decrease, the amount of bird mouthing that is prevalent in methods currently existing in the art, without adversely affecting productivity levels (i.e., throughput).

In one embodiment, the above-mentioned goals are achieved by a method of preparing dehydrated whole beans so as to preserve the beans' structural integrity, wherein the method comprises:
  cleaning, washing, and cooking raw beans; and
  drying the cooked beans in a combination microwave-convection heating process, wherein the beans are dried by exposure to both microwave energy and convective heating energy.

The above-mentioned goals are also achieved by a method of preparing dehydrated whole beans so as to preserve the structural integrity of substantially all of the beans (i.e., less than about 25% by weight incidence of bird mouthing in the dehydrated product), wherein the method comprises:
  providing a heating chamber for drying of cooked beans, wherein said chamber includes means for continuously advancing the cooked beans through said chamber; and
  drying the cooked beans in said chamber by exposing said beans to both microwave energy and convective heating energy.

In yet another embodiment, the above-mentioned goals are achieved by a method of preparing dehydrated whole beans so as to preserve the beans' structural integrity, wherein the method comprises: cleaning, washing, and cooking raw beans; arranging the cooked beans into multiple bean layers; and drying said layers of cooked beans using microwave energy, convective heating, or both microwave energy and convective heating energy.

In an alternative embodiment, a method of preparing dehydrated whole beans so as to preserve the structural integrity of substantially all of the beans comprises: providing a heating chamber for drying of cooked beans, wherein said chamber includes means for continuously advancing the cooked beans through said chamber; arranging the cooked beans into multiple bean layers; and drying said layers of cooked beans in said chamber using either microwave energy, convective heating, or both microwave energy and convective heating energy.

Embodiments of the invention are also directed to a method for producing a reconstitutable dehydrated chunky bean product, comprising:
  hydrating raw beans;
  cooking the hydrated beans;
  dividing the cooked beans into a first unchopped portion and a second unchopped portion;
  chopping said first portion of the cooked beans to form a composition of a desired texture;
  forming the texturized composition into a generally flat sheet;
  drying the flat sheet of texturized composition;
  forming the sheet into chunks;
  drying the second unchopped portion using a combination microwave-convection heating process; and
  adding the dried second unchopped portion of beans to said chunks.

In the above process, rather than dividing the cooked beans to obtain two separate unchopped portions from a single batch of cooked beans, a first unchopped portion of cooked beans may be obtained from the latter, and a second unchopped portion may be obtained from separately-hydrated and/or separately-cooked beans (e.g., cooked beans prepared under a different set of conditions than those used to prepare the first cooked, unchopped portion). It is noted that the designations "first" and "second" are used for identification purposes only and do not necessarily indicate an order of carrying out the invention. In addition, in alternative embodiments, each of the drying steps may by accomplished by using convective heating, microwave energy, or a combination thereof.

In an alternative embodiment, a method for producing a reconstitutable dehydrated chunky bean product comprises:
  hydrating raw beans;
  cooking the hydrated beans;
  dividing the cooked beans into a first unchopped portion and a second unchopped portion;
  chopping said first portion of the cooked beans to form a composition of a desired texture;
  forming the texturized composition into a generally flat sheet;
  drying the flat sheet of texturized composition;
  forming the sheet into chunks;
  arranging the second unchopped portion of cooked beans into multiple bean layers;
  drying said layers of cooked beans using microwave energy or a combination of microwave and convective energy; and
  adding the dried second unchopped portion of beans to said chunks.

Once again, in the above process, rather than dividing the cooked beans to obtain two separate unchopped portions from a single batch of cooked beans, a first unchopped portion of cooked beans may be obtained from the latter, and a second unchopped portion may be obtained from separately-hydrated and/or separately-cooked beans (e.g., cooked beans prepared under a different set of conditions than those used to prepare the first cooked, unchopped portion). It is noted that the designations "first" and "second" are used for identification purposes only and do not necessarily indicate an order of carrying out the above embodiment of the invention. In addition, in alternative embodiments, each of the drying steps may by accomplished by using convective heating, microwave energy, or a combination thereof.

Thus, embodiments of the present invention utilize convective heating and/or microwave energy to efficiently dry cooked whole beans and minimize "bird mouthing". As indicated by data collected from experiments, in a "dual-mode" drying process, use of the microwave mode will heat water from inside each bean, thus minimizing case hardening, and use of the convective mode will "blow" away evaporated water.

Experiments conducted in connection with the present invention may be summarized by the following examples. It is noted that, in all experiments, cooked beans having a moisture level of either about 70% by weight (see Examples 2–16) or about 58% by weight (see Examples 17–21) were used as starting material. For the latter, raw whole beans were cleaned, washed, and then cooked using the apparatus depicted in FIGS. 1–3 herein.

A batch convection/microwave oven was used in Examples 2–21. When operating in the convection/microwave mode, the oven is set up to provide intermittent microwave power (of approximately 0.6 kilowatts for approximately 40% of the time). The convection system, on the other hand, circulates hot air at a defined temperature, and is on "continuously", in the sense that, when the microwave mode is "off" (and the convection mode in "on"), energy is supplied to the heating elements of the convection oven, and fans (or blowers) blow the hot air through and around the mass of beans inside the chamber. However, when the microwave mode in "on", energy is no longer supplied to the heating elements, but the fans continue to operate, so that hot air inside the chamber is still forced through (and around) the mass of beans. Thus, during dehydration, convective heating is supplied in such a way as to generate and circulate hot air when microwave heating is not applied, and to circulate existing hot air, without generation of further convective heat, when microwave heating is applied.

When the convection/microwave oven is operated solely in the convection mode, the hot air at a defined temperature is simply recirculated around and through the product, and no microwave energy is applied.

EXAMPLE 2

A square microwave dish (6 in. on each side, and 1½ in. deep) was used to place about 244 grams of cooked whole beans inside a combination microwave-convection heating oven. With this setup, the beans arranged themselves in about 2–2½ layers within the dish.

The cooked beans had a moisture level of about 70%. The beans were first exposed to full microwave energy for a period of 3½ minutes (to heat them from room temperature to 212° F.). Next, the beans were dried using both microwave and convective energy for a period of approximately 12 minutes with the convective air temperature set at 250° F. During this time interval, microwave heating was supplied intermittently, for a total of approximately 40% of the time. In addition, the convection mode was fully "on" when the microwave mode was "off", and only partially "on" (i.e., fans continued to operate, so that hot air inside the oven was forced through and around the mass of beans) when the microwave mode was "on". At the end of this 12-minute time interval, the cooked whole bean material remaining in the dish weighed about 120 grams.

At this time, the beans were mixed, and then dried again in the oven for an additional period of about 8 minutes. This latter drying process was also carried out with the same combination microwave-convective heating procedure (with air temperature set at 250° F.) as that which was performed for the above-described 12-minute time period. At the end of the 8-minute time period, a total weight of about 82 grams of dried whole bean material remained. This included about 6 grams, or about 7.3%, of dried beans that were visually identified as being "bird mouthed".

EXAMPLE 3

The experiment of Example 2 was repeated, with the difference that the drying process was carried out using convective air set at 350° F., rather than at 250° F. Starting with 236 grams of cooked beans, the beans were first heated solely with microwave energy for 3½ minutes, and then for successive 12-minute and 8-minute periods using both microwave and convective heating as described in Example 2. This resulted in 76 grams of dried whole bean material, of which 14 grams, or about 18.4%, were identified as being bird mouthed.

EXAMPLE 4

The experiment of Example 2 was repeated, with the difference that only about one-half as much starting material was used, such that the beans arranged themselves in a single layer. This resulted in a shorter heating time, as well as about double the amount of microwave energy per unit mass of beans. Using the same dish as in Example 2, this resulted in only one layer of beans.

Thus, about 112 grams of beans were exposed to microwave energy for about 3½ minutes. This was then followed by an 11-minute period of both microwave and convective heating using air set at 250° F. The 41 grams of bean material remaining at the end of this period contained about 11 grams, or about 27%, of dried beans identified as being bird mouthed.

EXAMPLE 5

The experiment of Example 2 was repeated, with the difference that only microwave energy was used to dry the beans. Thus, 254 grams of cooked beans were exposed to full microwave power for 3½ minutes, followed by a 12-minute exposure to microwave energy with the power set at 40%. The beans were then mixed and dried for an additional 12 minutes using only microwave energy with the power similarly set at 40%. The 84 grams of dried bean material remaining at the end of this period contained about 13 grams, or about 15.5%, of visually-identified bird-mouthed beans.

EXAMPLE 6

100 grams of cooked beans were placed on a perforated rotating plate and exposed only to convection air heating set at 350° F. for successive 15-minute and 20-minute time periods. No microwave energy was applied. Thirty five minutes were needed to dry the beans. At the end of 35 minutes, all 39 grams (i.e., 100%) of the dried beans were bird-mouthed.

The following observations may be made based on the results of the experiments summarized in Examples 2–6 above. First, when convection is used exclusively to dry the high initial-moisture (about 70%) beans, the incidence of bird mouthing is higher than when either microwave energy, or a combination of convective heating and microwave energy are used. Thus, the pure convection experiment of Example 6 resulted in almost 100% bird mouthing, whereas the experiments of Examples 2, 3, and 5 resulted in only about 7.3%–18.4% bird mouthing. In addition, dehydration using microwave and convection heating requires less time than when pure convection is used.

Second, as evidenced by the results of Examples 2 and 3, dehydration of the beans using a combination of convection heating (with the air set at 250° F.) and microwave energy results in much less bird mouthing than when the same process is carried out at 350° F. As such, it is more advantageous to use lower initial temperatures in the "dual mode" process in order to avoid over-heating the beans.

Third, even when the "dual mode" process is carried out at 250° F., increasing the amount of microwave energy to which the beans are exposed results in a much larger bird-mouthing percentage due to overheating of the beans. This can be seen by a comparison of the results of Examples 2 and 4.

The following experiments were conducted in order to explore the significance of the thickness of the bean layer as the beans are being dried, as well as to compare the use of pure microwave energy, as opposed to a combination of convection heating and microwave energy, to dry the beans.

EXAMPLE 7

Similar to the experiment of Example 5, only microwave energy was used to dry 224 grams of cooked beans in an "open" dish (i.e., 6 in. on each side, and having no walls). With this configuration, the beans arranged themselves into approximately 1–2 layers. -After the initial 3½-minute (full microwave power) period, the beans were dried for 12 minutes, then mixed and dried for an additional 8 minutes with the microwave power set at 40%. Of the 72 grams of bean material remaining at the end of this period, about 23 grams, or about 32%, of the dried beans were bird-mouthed.

EXAMPLE 8

The experiment of Example 7 was repeated, except that a large bowl having a base diameter of 6 inches, a top diameter of 7 inches, and a depth of 4½ inches was used, which resulted in 2–2½ bean layers. After the 23½-minute dehydration period, about 32% of the dried beans were bird-mouthed.

EXAMPLE 9

The experiment of Example 8 was repeated (i.e., deep bowl 2–2½ bean layers), except that a combination of both microwave energy and convection heating with the air temperature set at 250° F. was used to dry the beans. After 23½ minutes (3½+12+8 minutes), the dried beans exhibited a bird-mouthed rate of about 25%.

EXAMPLE 10

The experiment of Example 7 was repeated (i.e., open dish, 1–2 layers), except that the beans were dried using a combination of convection heating (with the air set at 250° F.) and microwave energy. With the beans again arranging themselves in about 1–2 layers, after 23½ minutes (3½+12+8 minutes) and drying at about 250° F., the dried beans exhibited a bird-mouthed rate of about 33%.

EXAMPLE 11

Beans were placed in a small bowl (about 4½ inches in diameter and 3½ inches deep), where they arranged themselves in 4–5 layers. The beans were dried using a combination of both convection heating (with the air set at 250° F.) and microwave energy. After 23½ minutes (3½+12+8 minutes), the dried beans exhibited a bird-mouthed rate of about 11%. This experiment was repeated a second time, with a bird-mouthed rate of about 8%.

EXAMPLE 12

The experiment of example 11 was repeated, except that only microwave energy (at 40% power level) was applied. After 23½ minutes (3½+12+8 minutes), the dried beans exhibited a bird-mouthed rate of about 10%.

EXAMPLE 13

In order to assess the impact of drying under high humidity conditions, a large container having a diameter of 8½ inches, a depth of 1½ inches, and a lid having 8 transverse ⅛-inch holes was used to dry beans with microwave energy only. Beans were placed in the container and the lid used to cover the container. The beans, which arranged themselves in only 1 layer, were first dried for 3½ minutes at full power, followed by a 12-minute period with the microwave at about 40%. The beans were then mixed and dried for an additional 11 minutes using the microwave at about 40%. The dried beans exhibited about 14% bird mouthing.

EXAMPLE 14

The experiment of Example 13 was repeated with the lid removed. At the end of 26½ minutes, the dried beans exhibited about 30% bird mouthing.

EXAMPLE 15

A flat bowl (6 inches on each side, and 1¼ inches deep) was used to place about 230 grams of cooked whole beans inside a combination microwave-convection heating oven. With this setup, the beans arranged themselves in about 2–2½ layers within the bowl.

The beans were first exposed to full microwave power for a period of 3½ minutes. Next, the beans were dried for a period of approximately 12 minutes using both microwave energy (with power set at 40%) and convective heating (with the air temperature set at 250° F.). The beans were then mixed and dried for an additional 8-minute period. Of the remaining 63 grams of bean material about 9 grams, or about 14.3%, of the beans exhibited bird mouthing.

EXAMPLE 16

The experiment of Example 15 was repeated, with the difference that only microwave energy was used to dry the beans. After 23½ minutes (3½+12+8 minutes), the dried beans exhibited a bird-mouthed rate of about 27%.

The following observations may be made based on the results of the experiments summarized in Examples 7–16 above. First, when the beans are arranged in about 1–2 layers, dehydration with pure microwave energy as opposed to a combination of convective heating and microwave energy yields similar results. Thus, in Examples 7 and 10, 32% and 33%, respectively, of the beans were bird-mouthed.

Second, with 4–5 bean layers, dehydration with either pure microwave energy or a combination of convective heating and microwave energy yields very attractive results. Thus, Examples 11 and 12 indicate that, with multiple layers, especially in the range of 4–5 layers, a bird-mouthed rate of 8%–11% may be achieved.

Third, when the beans are arranged in 2–2½ layers in such a way that the effect of convection heating is either minimized or eliminated, dehydration using either pure microwave energy or a combination of convective heating and microwave energy yields similarly high bird-mouthed rates. Thus, in Examples 8 and 9, the relatively deep bowl in which the beans were dried nullifies the effect of convection heating, such that bird mouthing in the range of 25%–32% is observed.

Fourth, when the beans are arranged in 2–2½ layers, and the effect of convection heating is not minimized or eliminated, dehydration with a combination of convective heating and microwave energy yields more advantageous results than dehydration with pure microwave energy. Thus, the experiment of Example 15 resulted in a bird-mouth rate (14.3%) that was about half as much as that achieved in the experiment of Example 16 (i.e., about 27%).

Finally, when the beans are arranged in a single layer, as in Examples 13 and 14, dehydration of the beans in the presence of a higher amount of humidity provides better results. Thus, in the experiment of Example 13, a 14% bird-mouthing rate was achieved, compared to about 30% in the experiment of Example 14.

For purposes of comparison with the results of the above experiments, the following experiments were carried out using beans having a lower initial moisture content of about 58% that were cooked using the apparatus depicted in FIGS. 1–3 herein:

EXAMPLE 17

A flat dish (6 in. on each side, and having no walls) was used to place about 188 grams of cooked whole beans inside a combination microwave-convection heating oven. With this setup, the beans arranged themselves in about 1–2 layers within the dish.

The beans were first exposed to full microwave energy for a period of 3½ minutes. Next, the beans were dried for a period of approximately 12 minutes using both microwave and convective heating with the circulating air temperature set at 250° F. During this time interval, microwave heating was supplied intermittently, for a total of approximately 40% of the time. In addition, the convection mode was fully "on" when the microwave mode was "off", and only partially "on" (i.e., fans continued to operate, so that hot air inside the oven was forced through and around the mass of beans) when the microwave mode was "on". At the end of this 12-minute time interval, the cooked whole bean material remaining in the dish weighed about 82 grams.

At this time, the beans were mixed, and then heated again in the oven for an additional period of about 3 minutes. This latter heating process was also carried out using circulating air temperature set at 250° F., with the same combination microwave-convective heating procedure as that which was performed for the above-described 12-minute time period. At the end of the 3-minute time period, a total weight of about 77 grams of cooked whole bean material remained. This included about 8 grams, or about 10%, of the dried beans exhibiting a bird mouthed effect.

EXAMPLE 18

The experiment of Example 17 was repeated, with the difference that the successive 12- and 3-minute drying stages were carried out using circulating air temperature set at 225° F. rather than at 250° F. The dried beans exhibited a bird-mouthed rate of about 9%.

EXAMPLE 19

190 grams of cooked whole beans were placed on a flat dish (6 in. on each side, and having no walls), such that the beans arranged themselves in about 1–2 layers within the dish. The beans were exposed only to microwave energy at full power for an initial period of 3½ minutes, followed by 12 minutes of microwave energy at about 40% power (as explained above). The beans were then dried for an additional period of 4 minutes, again using solely microwave energy at about 40% power. At the end of the 19½-minute process, the dried beans exhibited a bird-mouthing rate of about 16%.

EXAMPLE 20

188 grams of beans were placed in a large container having a diameter of 8½ inches and a depth of 1½ inches, and the container was closed with a lid having 8 transverse ⅛-inch holes. The beans, which arranged themselves in only 1 layer, were dried using microwave energy only. The beans were first dried for 3½ minutes at full microwave power, followed by a 12-minute period with the microwave at about 40%. The beans were then dried for an additional period of 4 minutes, again using solely microwave energy at about 40% power. At the end of the 19½-minute process, the dried beans exhibited a bird-mouthing rate of about 5%.

EXAMPLE 21

188 grams of beans were placed in a small bowl (about 4½ inches in diameter and 3½ inches depth), where they arranged themselves in 4–5 layers. Using microwave energy only, as in Examples 19 and 20, the beans were first dried for 3½ minutes, followed by a 12-minute period with the microwave at about 40%. At the end of the 15½-minute process, the dried beans exhibited almost no bird-mouthing at all.

The following observations may be made based on the results of the experiments summarized in Examples 17–21 above. First, dehydration of cooked beans having a higher initial moisture content results in a higher rate of bird mouthing in the dried bean product. Thus, for instance, the experiments of Examples 7 and 10, in which beans having an initial moisture content of about 70% were used, yielded bird-mouthing rates of about 32–33%. In contrast, the experiments of Examples 17 and 19, in which beans having an initial moisture content of about 58% were used, yielded bird-mouthing rates of about 10–16%.

Second, with multiple bean layers, and in particular, with 4–5 bean layers, bird mouthing of the beans can be essentially eliminated. See, e.g., Example 21. In addition, as evidenced by the results of the experiment of Example 21, dehydration of the beans can be achieved in a shorter amount of time than would be possible with either pure convection heating or drying with 1–2 bean layers. In this regard, the experiment of Example 19, for instance, in which the beans arranged themselves in 1–2 layers, required 19½ minutes to dry the beans using microwave energy. In contrast, the experiment of Example 21 required only about 15½ minutes to accomplish the same task.

Third, as shown by a comparison of the results of the experiments of Examples 19, 20, and 21, the incidence of bird mouthing can also be reduced by drying the beans in a higher-humidity environment. Thus, the experiment of Example 20 resulted in only about 5% of the beans exhibiting bird mouthing, as opposed to about 16% in the experiment of Example 19. In addition, this reduction in bird mouthing can be achieved in a shorter amount of time (i.e., in this case, 19½ minutes) than would be possible with pure convection heating. Nevertheless, the higher-humidity dehydration process summarized in Example 20 is still slower than the larger-bean-layer dehydration process summarized in Example 21. Thus, it appears that, although either higher humidity conditions or larger bean layers may be used to decrease bird-mouthing rates, the dehydration process is faster when multiple bean layers are used.

Finally, with 1–2 layers of beans, dehydration using a combination of convective heating and microwave energy appears to be a slightly faster process than dehydration using pure microwave energy. Thus, the experiment of Example 17 took about 18½ minutes to complete and resulted in a bird-mouthing rate of about 10%. The experiment of Example 19, on the other hand, took about 19½ minutes to complete and resulted in a bird-mouthing rate of about 16%.

In this regard, and for purposes of comparison, beans from both moisture categories, i.e., those having an initial moisture content of about 58% (that were cooked using the apparatus depicted in FIGS. 1–3 herein) and those having an initial moisture content of about 70% were separately dried in a continuous impingement convection oven (e.g., Lincoln impingement oven) using convection only. In both cases, the beans were placed on a teflonized perforated plate (12 in.×12 in.), where they arranged themselves in about 1–1½ layers. The beans were then dried for just over 10 minutes at 235° F., followed by 8½ minutes at 265° F., and 9¼ minutes at 300° F. Thus, the total drying time was about 28 minutes.

In several experiments carried out according to the above conditions, at the end of the 28-minute period, the lower-moisture-content beans exhibited a bird-mouthing rate in the 21%–24% range. In contrast, the beans having a higher moisture content exhibited almost 100% bird mouthing. Comparison of these results with those of the above-described Examples indicates that, while drying the lower-moisture-content beans using solely convective heating may result in slightly higher drying times, it does, nevertheless, allow for bird-mouthing rates that are below 25%, i.e., where a substantial fraction of the dried whole beans preserve their structural integrity.

All in all, the above experiments point to an extremely attractive, and surprising, result: dehydration of beans in larger layers using either pure microwave energy or a combination of convective heating and microwave energy provides not only lower bird-mouthing rates, but also higher throughput. Thus, embodiments of the present invention provide for an industrial solution whereby more beans can be produced in a shorter amount of time, with a substantial fraction of the beans retaining their structural integrity.

In this regard, embodiments of the invention may employ a heating chamber allowing continuous product passage therethrough, rather than a traditional convection/microwave oven. Thus, for example, a heating chamber capable of providing convective heating and/or microwave energy may be equipped with a conveyor or other similar means for continuously advancing the beans through the chamber. In this configuration, the speed of the conveyor will be determined by the number of bean layers, the exposure temperature, the required duration of exposure, the level of humidity within the chamber, etc.

Embodiments of the present invention are also directed to a method of producing a reconstitutable dehydrated chunky bean product, wherein dried whole beans produced by the methods described immediately above so as to be substantially free of bird-mouthing effects can be added at various points within the process outlined in FIG. 6. In this way, a reconstitutable dehydrated bean product may be produced that has an improved amount of chunkiness and home-made feel due to the existence of actual, structurally intact, whole beans in the final, reconstituted product.

FIGS. 7 and 8 show additional non-exhaustive, alternative embodiments of the invention. Thus, in one embodiment shown in FIG. 7, raw beans are first cleaned, washed, hydrated, and cooked. The cooked beans are then divided into a first unchopped portion and a second unchopped portion. The first portion of beans is then chopped into a texturized composition that is, in turn, formed into a generally flat, and preferably ribbed, sheet. Next, the sheet of texturized composition is dried and formed into chunks. As shown in FIG. 7, the second portion of (unchopped) beans may be arranged into multiple bean layers and dried using microwave energy, convective heating, or a combination of microwave and convective energy; the dried whole beans are then added to the chunks (from the first portion).

FIG. 8 allows for similar alternatives, except that separate portions of beans, e.g., those destined to be chopped and those that are maintained whole, are processed according to separate processing conditions designed to further enhance the organoleptic properties of the different bean portions (e.g., using different hydration times, different cooking temperatures, etc. to make the dehydrated whole beans more tender upon reconstitution with water).

It is noted that the dried second portion of unchopped beans may also be added at various other points in the processes shown in FIGS. 6–8. In addition, as shown in FIGS. 7 and 8 for illustrative purposes, flavor ingredients and/or oil may be added to either portion of beans at various points (e.g., prior to cooking, prior to chopping, etc.).

It will be apparent to a person of ordinary skill in the art that embodiments of the present invention are not limited in their design or application to specific embodiments disclosed herein. For example, while the steps of embodiments of the methodology lend themselves to dried legumes, other food-stuffs are also within the scope of the present invention. For example, the apparatus can be used to cook foods such as carrots, celery, meats, chicken, fish and the like without the use of excess amounts of water. Thus, the present invention is intended to encompass all of the embodiments disclosed and suggested herein as defined by the claims appended hereto and any equivalents thereof.

What is claimed is:

1. A method for producing a reconstitutable dehydrated chunky bean product, comprising:
    a. hydrating raw beans;
    b. cooking the hydrated beans;
    c. dividing the cooked beans into a first unchopped portion and a second unchopped portion;
    d. chopping said first portion of the cooked beans to form a composition of a desired texture;
    e. forming the texturized composition into a generally flat sheet;
    f. drying the flat sheet of texturized composition;
    g. forming the sheet into chunks;
    h. drying said second unchopped portion using a combination microwave-convection heating process; and
    i. adding the dried second unchopped portion of beans to said chunks.

2. The method of claim 1, wherein said generally flat sheet of texturized composition has a ribbed top surface.

3. The method of claim 2, wherein said generally flat sheet of texturized composition has a ribbed bottom surface.

4. A method for producing a reconstitutable dehydrated chunky bean product, comprising:
    a. hydrating raw beans;
    b. cooking the hydrated beans;
    c. dividing the cooked beans into a first unchopped portion and a second unchopped portion;
    d. chopping said first portion of the cooked beans to form a composition of a desired texture;
    e. forming the texturized composition into a generally flat sheet;
    f. drying the flat sheet of texturized composition;
    g. forming the sheet into chunks;
    h. arranging the second unchopped portion of cooked beans into multiple bean layers;
    i. drying said layers of cooked beans using microwave energy; and
    j. adding the dried second unchopped portion of beans to said chunks.

5. The method of claim 4, wherein, in step (h), the second unchopped portion of cooked beans is arranged into at least four layers.

6. The method of claim 4, wherein, in step (i), the layers of cooked beans are dried using convective heating in addition to said microwave energy.

7. The method of claim 6, wherein the layers of cooked beans are dried by simultaneous exposure to said microwave energy and convective heating.

8. The method of claim 4, wherein the generally flat sheet of texturized composition has a top surface and a bottom surface and at least one of said top and bottom surfaces is ribbed.

9. A method for producing a reconstitutable dehydrated chunky bean product, comprising:
    a. hydrating raw beans;
    b. cooking the hydrated beans;
    c. dividing the cooked beans into a first unchopped portion and a second unchopped portion;
    d. chopping said first portion of the cooked beans to form a composition of a desired texture;
    e. forming the texturized composition into a generally flat sheet;
    f. drying said second unchopped portion using a combination microwave-convection heating process;
    g. adding the dried second unchopped portion of beans to said sheet;
    h. drying the flat sheet of texturized composition; and
    i. forming the sheet into chunks.

10. The method of claim 9, wherein the generally flat sheet of texturized composition has a top surface and a bottom surface and at least one of said top and bottom surfaces is ribbed.

11. A method for producing a reconstitutable dehydrated chunky bean product, comprising:
    a. hydrating raw beans;
    b. cooking the hydrated beans;
    c. dividing the cooked beans into a first unchopped portion and a second unchopped portion;
    d. chopping said first portion of the cooked beans to form a composition of a desired texture;
    e. forming the texturized composition into a generally flat sheet;
    f. arranging the second unchopped portion of cooked beans into multiple bean layers;
    g. drying said layers of cooked beans using microwave energy;
    h. adding the dried second unchopped portion of beans to said sheet;
    i. drying the flat sheet of texturized composition;
    j. forming the sheet into chunks.

12. The method of claim 11, wherein, in step (g), the layers of cooked beans are dried using convective heating in addition to said microwave energy.

13. The method of claim 12, wherein the layers of cooked beans are dried by simultaneous exposure to said microwave energy and convective heating.

14. The method of claim 11, wherein the generally flat sheet of texturized composition has a top surface and a bottom surface and at least one of said top and bottom surfaces is ribbed.

15. A method for producing a reconstitutable dehydrated chunky bean product, comprising:
    a. separately hydrating a first portion and a second portion of unchopped raw beans to obtain respective first and second portions of unchopped hydrated beans;

b. separately cooking each of said first and second portions of hydrated beans to obtain respective first and second portions of unchopped cooked beans;
c. chopping said first portion of the cooked beans to form a composition of a desired texture;
d. forming the texturized composition into a generally flat sheet;
e. drying the flat sheet of texturizedcomposition;
f. forming the sheet into chunks;
g. drying the second portion of unchopped cooked beans by simultaneous exposure to microwave energy and convective heating; and
h. adding the dried second portion of unchopped cooked beans to said chunks.

16. The method of claim 15, wherein the generally flat sheet of texturized composition has a top surface and a bottom surface and at least one of said top and bottom surfaces is ribbed.

17. The method of claim 15, wherein, in steps (a) and (b), said first portion of unchopped beans is hydrated and cooked under a first set of processing conditions and said second portion of unchopped beans is hydrated and cooked under a second set of processing conditions.

18. The method of claim 17, wherein said first set of processing conditions is the same as said second set of processing conditions.

19. A method for producing a reconstitutable dehydrated chunky bean product, comprising:
a. separately hydrating a first portion and a second portion of unchopped raw beans to obtain respective first and second portions of unchopped hydrated beans;
b. separately cooking each of said first and second portions of hydrated beans to obtain respective first and second portions of unchopped cooked beans;
c. chopping said first portion of the cooked beans to form a composition of a desired texture;
d. forming the texturized composition into a generally flat sheet;
e. drying the flat sheet of texturized composition;
f. forming the sheet into chunks;
g. arranging the second portion of unchopped cooked beans into multiple bean layers;
h. drying said layers of unchopped cooked beans using microwave energy; and
i. adding the dried second portion of unchopped cooked beans to said chunks.

20. The method of claim 19, further including adding flavor ingredients to each of said first and second portions.

21. The method of claim 19, further including adding oil to each of said first and second portions.

22. The method of claim 19, further including adding a colorant to each of said first and second portions.

23. The method of claim 19, wherein, in step (h), the layers of unchopped cooked beans are dried using convective heating in addition to said microwave energy.

24. The method of claim 23, wherein the layers of unchopped cooked beans are dried by simultaneous exposure to said microwave energy and convective heating.

25. The method of claim 19, wherein the generally flat sheet of texturized composition has a top surface and a bottom surface and at least one of said top and bottom surfaces is ribbed.

26. The method of claim 19, wherein, in steps (a) and (b), said first portion of unchopped beans is hydrated and cooked under a first set of processing conditions and said second portion of unchopped beans is hydrated and cooked under a second set of processing conditions.

27. The method of claim 26, wherein said first set of processing conditions is the same as said second set of processing conditions.

28. A method for producing a reconstitutable dehydrated chunky bean product, comprising:
a. separately hydrating a first portion and a second portion of unchopped raw beans to obtain respective first and second portions of unchopped hydrated beans;
b. separately cooking each of said first and second portions of hydrated beans to obtain respective first and second portions of unchopped cooked beans;
c. chopping said first portion of the cooked beans to form a composition of a desired texture;
d. forming the texturized composition into a generally flat sheet having ribbed top and bottom surfaces;
e. drying the ribbed sheet of texturized composition;
f. forming the sheet into chunks;
g. drying the second portion of unchopped cooked beans using convective heating; and
h. adding the dried second portion of unchopped cooked beans to said chunks.

29. The method of claim 28, further including, prior to step (g), arranging the second portion of unchopped cooked beans into multiple bean layers and, in step (g), drying said layers using convective heating.

30. The method of claim 28, further including adding to at least one of said first and second portions a member selected from the group consisting of flavor ingredients, oil, and colorant.

31. The method of claim 1, wherein, in step (b), the hydrated beans are cooked in a stationary vessel.

32. The method of claim 31, wherein, in step (a), the raw beans are hydrated in said stationary vessel.

33. The method of claim 4, wherein, in step (b), the hydrated beans are cooked in a stationary vessel.

34. The method of claim 33, wherein, in step (a), the raw beans are hydrated in said stationary vessel.

35. The method of claim 9, wherein, in step (b), the hydrated beans are cooked in a stationary vessel.

36. The method of claim 35, wherein, in step (a), the raw beans are hydrated in said stationary vessel.

37. The method of claim 11, wherein, in step (b), the hydrated beans are cooked in a stationary vessel.

38. The method of claim 37, wherein, in step (a), the raw beans are hydrated in said stationary vessel.

39. The method of claim 15, wherein, in step (b), at least one of said first and second portions of unchopped hydrated beans is cooked in a stationary vessel.

40. The method of claim 17, wherein at least one of said first and second portions of unchopped beans is cooked in a stationary vessel.

41. The method of claim 19, wherein, in step (b), at least one of said first and second portions of unchopped hydrated beans is cooked in a stationary vessel.

42. The method of claim 26, wherein at least one of said first and second portions of unchopped beans is cooked in a stationary vessel.

43. The method of claim 28, wherein, in step (b), at least one of said first and second portions of unchopped hydrated beans is cooked in a stationary vessel.

* * * * *